(No Model.) 2 Sheets—Sheet 1.

J. R. FARNHAM.
BUTTER TONGS.

No. 557,982. Patented Apr. 7, 1896.

Witnesses:
C. F. Kleyn
R. D. Merchant

Inventor.
James R. Farnham,
By his Attorney
Jas. F. Williamson.

(No Model.) 2 Sheets—Sheet 2.
J. R. FARNHAM.
BUTTER TONGS.
No. 557,982. Patented Apr. 7, 1896.
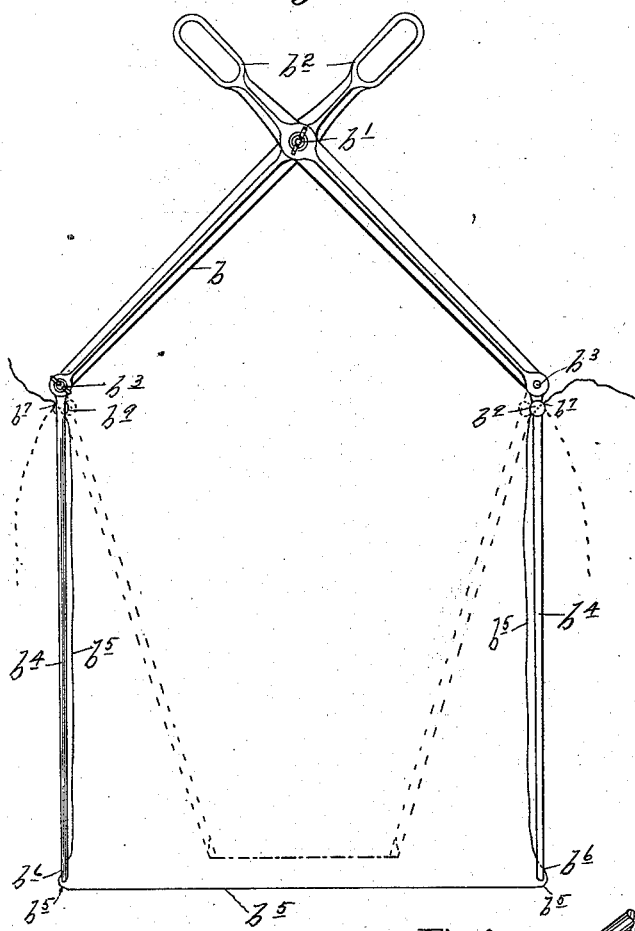
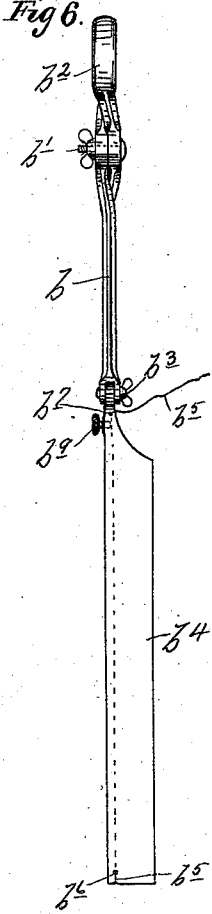
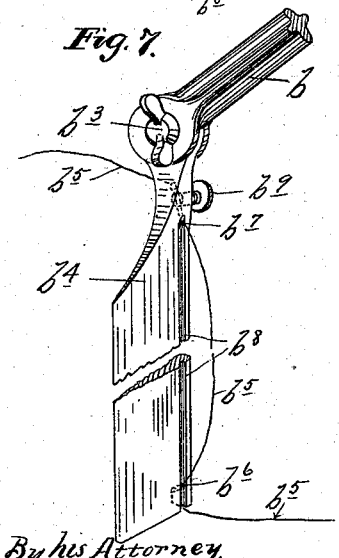
Witnesses:
C. F. Kilgore
R. D. Merchant
Inventor:
James R. Farnham
By his Attorney,
Jas. F. Williamson

UNITED STATES PATENT OFFICE.

JAMES R. FARNHAM, OF MINNEAPOLIS, MINNESOTA.

BUTTER-TONGS.

SPECIFICATION forming part of Letters Patent No. 557,982, dated April 7, 1896.

Application filed August 15, 1895. Serial No. 559,315. (No model.)

*To all whom it may concern:*

Be it known that I, JAMES R. FARNHAM, a citizen of the United States, residing at Minneapolis, in the county of Hennepin and State of Minnesota, have invented certain new and useful Improvements in Butter-Tongs; and I do hereby declare the following to be a full, clear, and exact description of the invention, such as will enable others skilled in the art to which it appertains to make and use the same.

My invention has for its object to provide a convenient device for the removal of butter or other similar material in layers from the firkin or other vessel containing the same.

To this end the invention consists of the novel devices and combinations of devices hereinafter described, and defined in the claims.

The invention is illustrated in the accompanying drawings, wherein, like letters referring to like parts throughout the several views—

Figure 1:
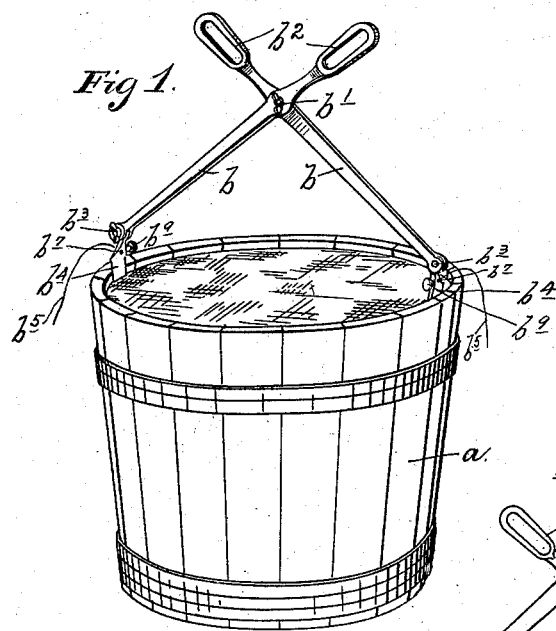
Figure 2:
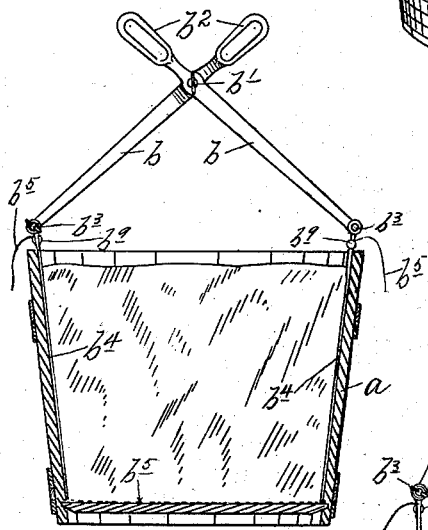
Figure 3:
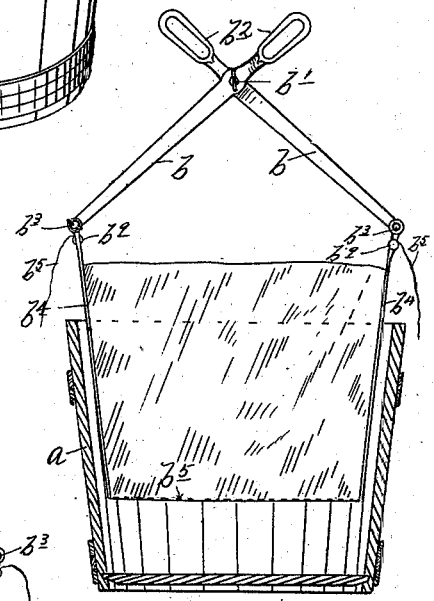
Figure 4:
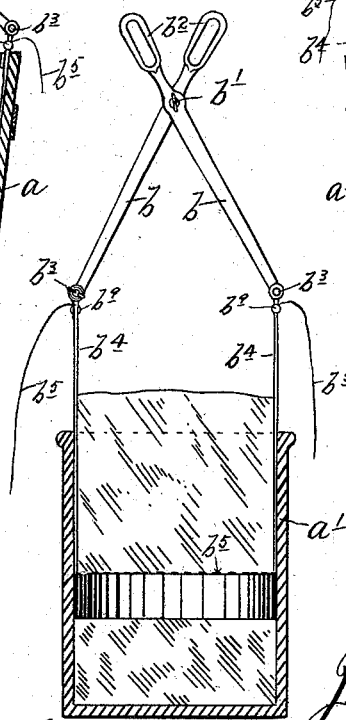

Figure 1 is a perspective view showing a butter-firkin with my device in working position therein. Fig. 2 is a sectional view of the same in the line or plane of the cross-wire connecting the lower ends of the blade. Fig. 3 is a view similar to Fig. 2, showing the parts as they would appear after the butter or other material had been separated from the walls of the firkin and the butter partially withdrawn by the device. Fig. 4 is a sectional view similar to Fig. 3, showing the device as applied to a jar instead of a firkin and for removing a layer of the butter instead of the whole contents of the vessel. Fig. 5 is a front elevation of the butter-tongs or device detached, the full lines showing the blades as spread widely apart and the dotted lines showing the same as drawn more closely together at their lower ends by the adjustment of the cross-wire. Fig. 6 is a side elevation of the parts shown in Fig. 5, and Fig. 7 is a detail in perspective, showing one of the blades and part of one of the tong-levers detached.

$a$ $a'$ represent open-top vessels of the kind ordinarily employed for holding butter or other similar material. The vessel $a$ is the ordinary firkin and the vessel $a'$ an ordinary stone jar.

$b$ $b$ represent a pair of tong-levers, which are pivoted together by a clamping-screw $b'$ and provided at their upper ends with hand-openings or handles $b^2$. To the lower ends of the said tong-levers are pivotally attached, by clamping-screws $b^3$, a pair of blades $b^4$. The said blades $b^4$ are connected at their lower ends by an adjustable wire $b^5$, which works through eyes $b^6$ $b^7$ and in vertical grooves $b^8$ of the respective blades $b^4$. The upper ends of the wire $b^5$ are securable by clamping-screws $b^9$, tapped into the backs of the blades $b^4$. The wire $b^5$ is passed through the eyes $b^6$ of the blades $b^4$ from the inside outward in the case of one of the blades and from the outside inward in the case of the other blade, so as to bring the horizontal section of the wire $b^5$ to the lowest point of the said blades. The vertical grooves $b^8$ are formed on the inner faces of the blades $b^4$ and near the backs or thick parts of the said blades.

The several clamping-screws $b'$, $b^8$, and $b^9$ are all of the thumb-screw variety for the ready operation by hand.

With the construction above described it is obvious that by adjusting the wire $b^5$ through the upper eyes $b^7$ the horizontal cross-section of the same, which connects the lower ends of the blades $b^4$, may be varied in length for affording any desired spread to the said horizontal section of the wire and the lower ends of the blades. The said adjustment of the wire is readily made by pulling the wire upward or downward through the eyes in the blades and securing the upper ends of the wire by the clamping-screws $b^9$. Likewise the tong-levers may be locked together at any desired spread by the clamping-screws $b'$, so as to hold the upper end of the blades $b^4$ at any desired distance apart. The upper ends of the blades $b^4$ may also be locked to the lower ends of the tong-levers $b$ by the clamping-screws $b^3$. Hence it must be obvious that the blades $b^4$ and the wire $b^5$ are adjustable in every way required for adapting the same to operate in different sizes or different shapes of vessels.

Having regard to the action of the device, the operation is probably clear from an inspection of Figs. 1 to 4, inclusive. Supposing the device to be properly adjusted to the size and shape of the vessel, the wire and blades will be forced downward into the vessel, in which action the wire will cut its way through the diameter of the mass of butter and the blades will enter along the vertical walls of the vessel. When thus entered to the desired extent, the tongs are given a complete rotation by the operator, which will have the effect of separating the desired layer, or the whole mass embraced between the blades and the wire, from the vessel or from the sides of the vessel and the mass of butter below the level of the wire. By then pulling upward on the tongs the separated layer may be readily removed from the vessel. In this pulling-out action the blades $b^4$ will clamp the sides of the embraced layer of butter and the wire will pull on the bottom of the same. The blades are made of the requisite width to give sufficient frictional contact, under the clamping action thus noted, for pulling out the layer of butter without drawing the wire back upward through the same, or the blades may be provided with other forms of frictional surfaces on their inner faces, which will pass the butter freely on the downward movement of the blades and engage therewith on the upward movement of the same.

It is obvious that this device is a great convenience to storekeepers and others who retail butter. It is possible to remove a layer of any desired depth from the firkin without mussing up either the part removed or the mass left remaining in the vessel. The salesman would also, by short practice, learn to gage the depth of layer required for any given purchase.

The device or butter-tongs herein described were especially designed for use in handling butter; but it will be understood, of course, that the same could also be used for handling some kinds of cheese, pressed meats, and various other kinds of materials which are sufficiently soft to permit the proper action of the wire and the blades and are sufficiently stiff or coherent to permit the severed layers to be withdrawn under the clamping action of the tongs.

It will be understood, of course, that some of the details of the construction might be changed without departing from the spirit of my invention. For instance, even if the cutting-wire was dispensed with, the tongs with the pivoted blades, as set forth, would still be a useful device for loosening and removing the contents of butter-jars, &c.

In virtue of the pivoted feature of the blades and tongues it is obvious that said blades may be made to conform to the walls of the vessel regardless of the diameter or angle of the walls of the particular vessel to which the device is applied.

The word "wire" as herein used is intended to cover any form of cutter adapted to connect the lower ends of the blades to permit the same to be adjusted and to coöperate therewith in the manner herein specified.

What I claim, and desire to secure by Letters Patent of the United States, is as follows:

1. A device for removing butter or other material from firkins or other vessels, comprising a pair of tongs and a pair of blades, pivoted one to the free end of each tong-lever, whereby said blades may be inserted endwise into the vessel and made to conform to the walls of the same, regardless of the diameter of the vessel or the angle of its walls, substantially as and for the purpose set forth.

2. The combination with a pair of tongs, of a pair of blades pivoted to the lower ends of the tongs and a cross-wire or cutter connecting the lower ends of the blades, which parts are operative substantially as described, to remove butter or other material, in layers, from the vessels containing the same.

3. The combination with a pair of tongs, of a pair of blades pivoted to the lower ends of the tongs and a cross-wire or cutter connecting the lower ends of said blades, which wire is adjustable to adapt the spread of the blades and wire to different sizes and shapes of vessels, substantially as described.

4. The combination with the pair of tongs, of the pair of blades pivoted thereto, the cross-wire connecting the lower ends of said blades and extending upward along the sides of the blades and clamping devices at the tops of the blades, for clamping and adjustably securing said wire, substantially as described.

5. The combination with the tong-levers pivoted together by the clamping-screw $b'$ of the blades $b^4$, pivoted to the lower ends of said tong-levers by the clamping-screws $b^3$ and provided with the wire-grooves $b^8$ and eyes $b^6$ $b^7$, and the wire $b^5$ with its horizontal section connecting the lower ends of said blades and its vertical sections seated in said grooves and eyes and adjustably secured therein, by the clamping-screws $b^9$, all substantially as and for the purposes set forth.

In testimony whereof I affix my signature in presence of two witnesses.

JAMES R. FARNHAM.

Witnesses:
JAS. F. WILLIAMSON,
BESSIE BOOTH NELSON.